(12) United States Patent
Celebi

(10) Patent No.: US 6,778,618 B1
(45) Date of Patent: Aug. 17, 2004

(54) METHODS AND DEVICES FOR MINIMIZING INTERBLOCK INTERFERENCE IN DISCRETE MULTI-TONE DEVICES

(75) Inventor: Samel Celebi, Little Falls, NJ (US)

(73) Assignee: Agere Systems, Inc., Allentown, PA (US)

( * ) Notice: Subject to any disclaimer, the term of this patent is extended or adjusted under 35 U.S.C. 154(b) by 636 days.

(21) Appl. No.: 09/639,641

(22) Filed: Aug. 16, 2000

(51) Int. Cl.[7] .......................... H03D 1/04; H03D 1/06; H03K 5/01; H03K 6/04; H04B 1/10; H04L 1/00; H04L 25/08

(52) U.S. Cl. .................. 375/346; 375/350; 375/285

(58) Field of Search ................. 375/285, 346, 375/348, 350, 229, 230

(56) References Cited

U.S. PATENT DOCUMENTS

| | | | | | |
|---|---|---|---|---|---|
| 5,117,291 | A | * | 5/1992 | Fadavi-Ardekani et al. | 348/614 |
| 5,142,551 | A | * | 8/1992 | Borth et al. | 375/219 |
| 5,471,504 | A | * | 11/1995 | Lee et al. | 375/233 |
| 5,917,855 | A | * | 6/1999 | Kim | 375/229 |
| 6,269,131 | B1 | * | 7/2001 | Gothe et al. | 375/346 |
| 6,396,886 | B1 | * | 5/2002 | Kapoor | 375/350 |
| 6,600,794 | B1 | * | 7/2003 | Agarossi et al. | 375/341 |
| 2001/0008543 | A1 | * | 7/2001 | Tanada | 375/232 |

FOREIGN PATENT DOCUMENTS

EP    001028563 A2  *  8/2000

* cited by examiner

Primary Examiner—Jean B. Corrielus

(57) ABSTRACT

Novel equalizer coefficients are applied to "tails" of a channel impulse response to substantially minimize interblock interference. The coefficients are selected based on the realization that each point along the tail of a channel's impulse response contributes a non-uniform amount of interblock interference, rather than a uniform amount, as previously believed.

7 Claims, 3 Drawing Sheets

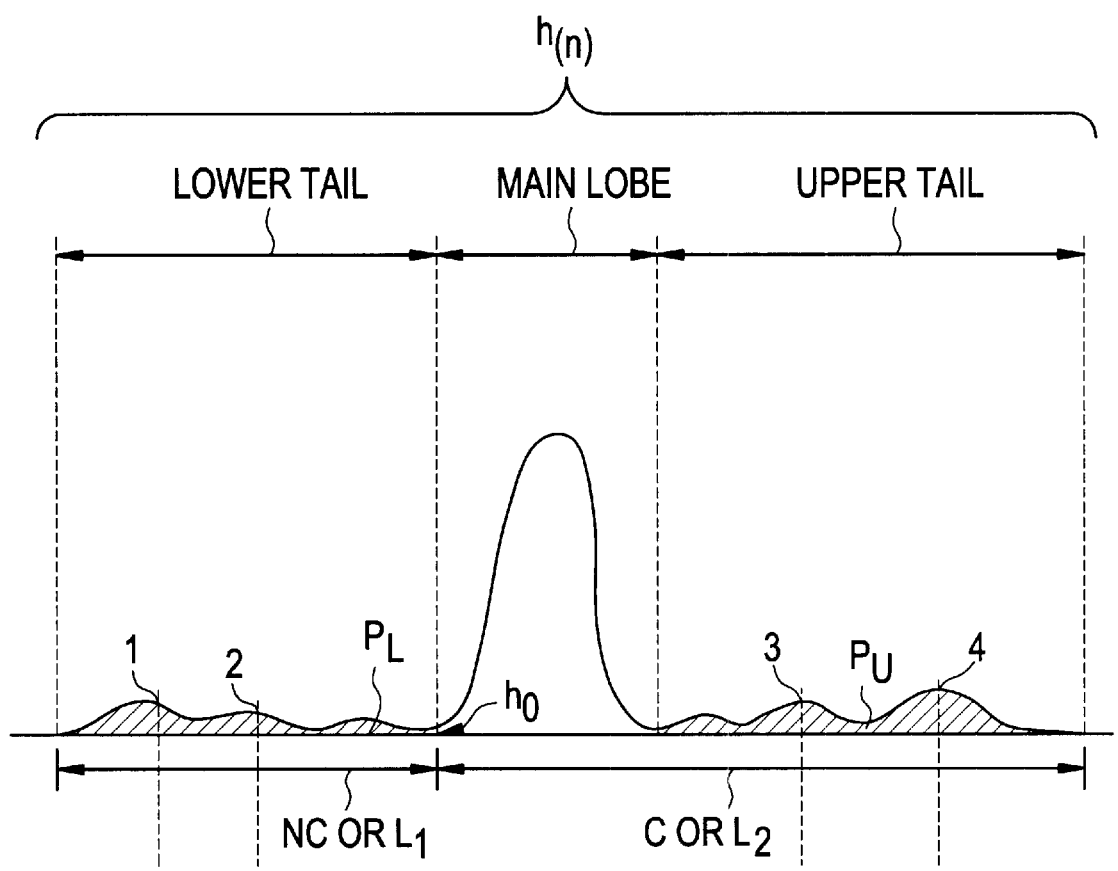
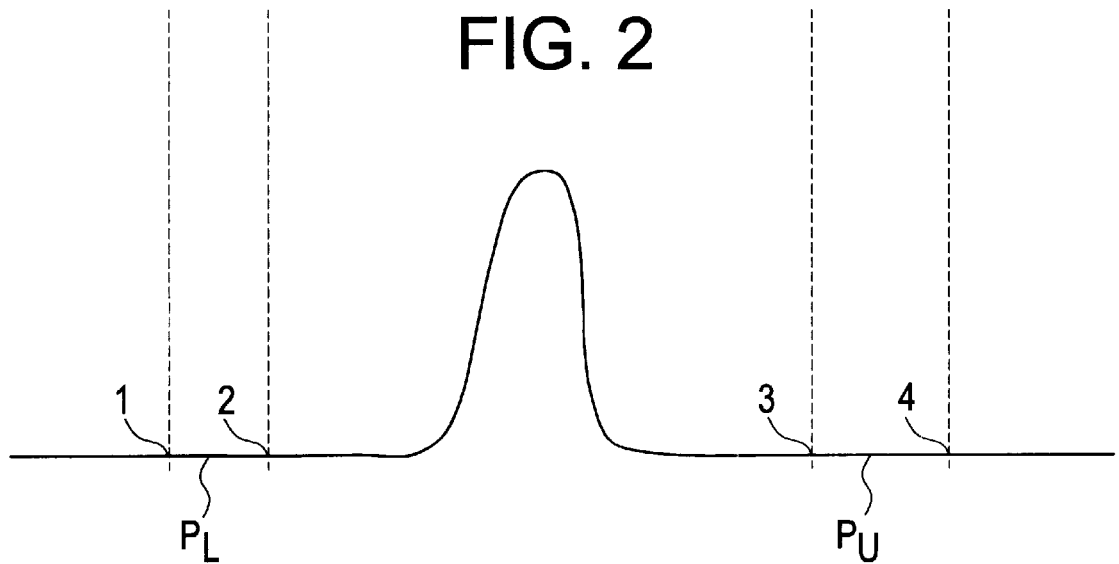

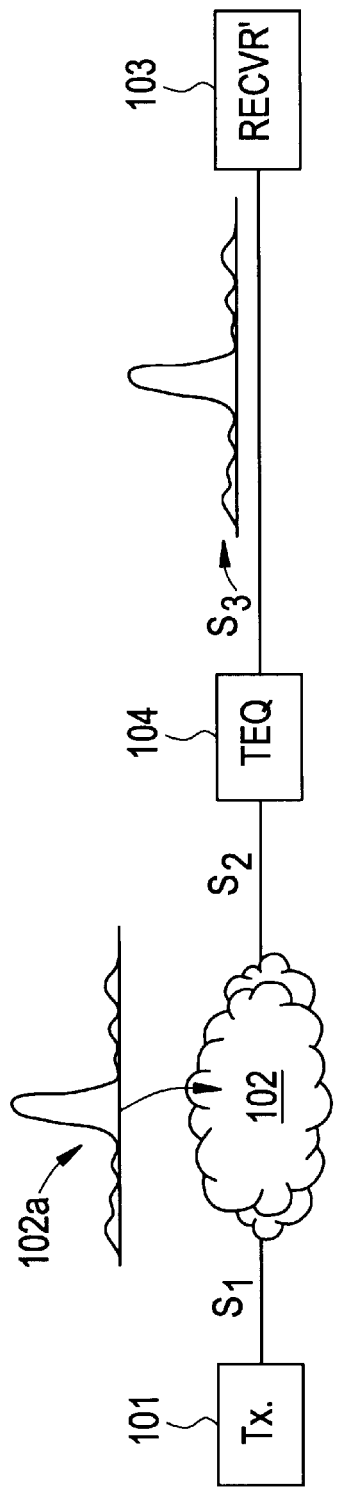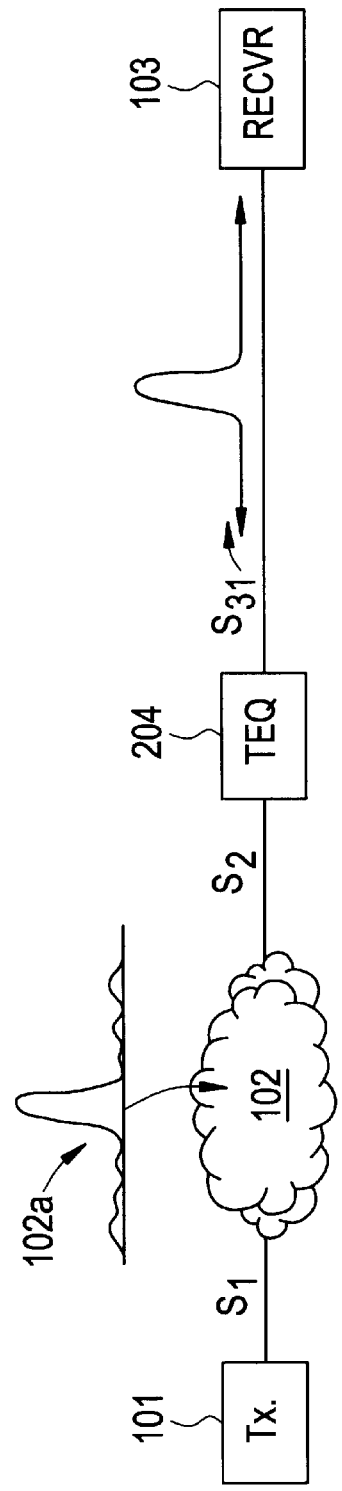

METHODS AND DEVICES FOR MINIMIZING INTERBLOCK INTERFERENCE IN DISCRETE MULTI-TONE DEVICES

BACKGROUND OF THE INVENTION

A "digital subscriber loop" ("DSL") is a type of communications connection and/or service which is now being offered by many local exchange carriers (e.g., telephone companies) to consumers and businesses alike as a way of receiving faster Internet connections and downloads.

Digital, multi-tone transceivers ("DMTs") are devices which are designed to send and receive DSL-compatible signals (hereinafter "DSL signals").

The quality of a DSL signal received by a DMT depends on a number of factors. One such factor is the amount of interblock interference ("IBI"). In an attempt to avoid the undesirable effects of IBI, DMTs are designed to generate and insert a guard time sequence, called a cyclic prefix, between each data block. In order to completely eliminate IBI, the cycle prefix has to be at least as long as the impulse response of the channel through which DMTs transmit DSL signals. However, in practice this can rarely be achieved, necessitating the use of supplemental methods and devices to minimize IBI. One such device is a time domain equalizer ("TEQ").

Generally speaking, a TEQ is an electronic filter which filters out the effects of IBI. More specifically, a TEQ is a type of "finite impulse response" ("FIR") filter.

FIG. 1 depicts a graph of a typical, simplified impulse response, h(n), of a DSL channel. Traditionally, the graph shown in FIG. 1 is described as having a "non-causal" portion, ("NC"), and a "causal" portion, ("C"). The non-causal section comprises, what will be referred to as a "lower tail," while the causal portion comprises "main lobe" and "upper tail sections," respectively.

Existing TEQs have been able to reduce IBI by reducing the power in the tails. However, existing TEQs have not been able to substantially minimize IBI.

FIG. 2 depicts a graph of an "ideal", theoretical impulse response where the power within both tails has been reduced to zero. Simplified, eliminating the power within both tails means eliminating the tails altogether.

Comparing FIG. 1 with FIG. 2, it can be seen that the signal levels of points 1–4 have been lowered to zero. Whereas the impulse response in FIG. 1 contained power in each of its tails (represented by the area under each tail, $P_L$ and $P_u$, respectively), such power has been eliminated within the ideal impulse response shown in FIG. 2.

FIG. 3 depicts a simplified block diagram of a circuit 100 comprising a TEQ 104. It should be understood that this "circuit" may comprise integrated circuits, discrete devices, or the like.

As shown, a signal $S_1$ is transmitted by transmitter 101 through a communications channel 102. The channel 102 can be characterized by an impulse response 102a. Signal $S_2$ represents a distorted version of signal $S_1$. Some of the distortion is due to IBI. Before being received by a receiver 103, the signal $S_2$ is input into a TEQ 104 in order to reduce IBI. It should be noted that transmitter 101 and receiver 103 may both comprise DMT/DSL transceivers or the like and that the TEQ 104 is typically a part of receiver 103.

In an attempt to minimize IBI, existing TEQ's utilize "equalizer coefficients" (hereafter "coefficients") which are adapted to reduce the power under the tails of a composite impulse response (i.e., combination of the TEQ and original channel). This approach reduces IBI, but it does not substantially minimize IBI.

To make the explanation which follows as clear as possible, these coefficients can be thought of as "weights." That is, a TEQ is adapted to filter the impulse response with its weights so as to lower the power in the tails of the composite impulse response. There exists methods and devices which utilize such weights to so reduce IBI. Again, though IBI is reduced, it is not substantially minimized.

A major reason why IBI is not minimized is due to a fundamental flaw regarding the nature of how different points along a tail contribute to IBI.

To date, it has been assumed that different points along the tails of an impulse response contribute equally to IBI. Based on this erroneous assumption, existing TEQs are designed so that the coefficients uniformly reduce the power in each tail.

The present inventor discovered that each portion of a tail, for example, portions represented by points 1–4 in FIG. 1, contribute non-uniform amounts of power to IBI.

Accordingly, it is a desire of the present invention to provide for methods and devices which substantially minimize IBI in DMTs.

It is another desire of the invention to provide for methods and devices which substantially minimize IBI in DMTs by taking into consideration the fact that each portion of a tail of a channel's impulse response contributes a non-uniform amount of IBI.

Other desires will become apparent to those skilled in the art from the following description taken in conjunction with the accompanying drawings and claims.

SUMMARY OF THE INVENTION

In accordance with the present invention there are provided methods and devices for substantially minimizing interblock interference. One device envisioned by the present invention comprises a finite impulse response filter adapted to apply differential coefficients to a channel's impulse response. Such a device may comprise a DMT, or DSL transceiver to name just a few examples.

The differential coefficients envisioned by the present invention are derived from a novel weighting matrix of differential factors. The factors are selected by taking into account that each point along a tail of a channel's impulse response contributes a different amount of IBI. More specifically, points located the furthest from the time of reference of a channel's impulse response contribute more IBI than points located closer (e.g., point 1 in FIG. 1 contributes more IBI than point 2).

Novel filters making use of such differential coefficients are applied to tails of the impulse response to substantially minimize IBI.

Both devices and methods are envisioned by the present invention.

The present invention and its advantages can be best understood with reference to the drawings, detailed description of the invention and claims that follow.

BRIEF DESCRIPTION OF THE DRAWINGS

FIG. 1 depicts an example of an impulse response.

FIG. 2 depicts an ideal impulse response.

FIG. 3 depicts a simplified block diagram of a circuit comprising a TEQ.

FIG. 4 depicts a simplified block diagram of a method or device for substantially minimizing IBI according to one embodiment of the present invention.

DETAILED DESCRIPTION OF THE INVENTION

Figure 5:
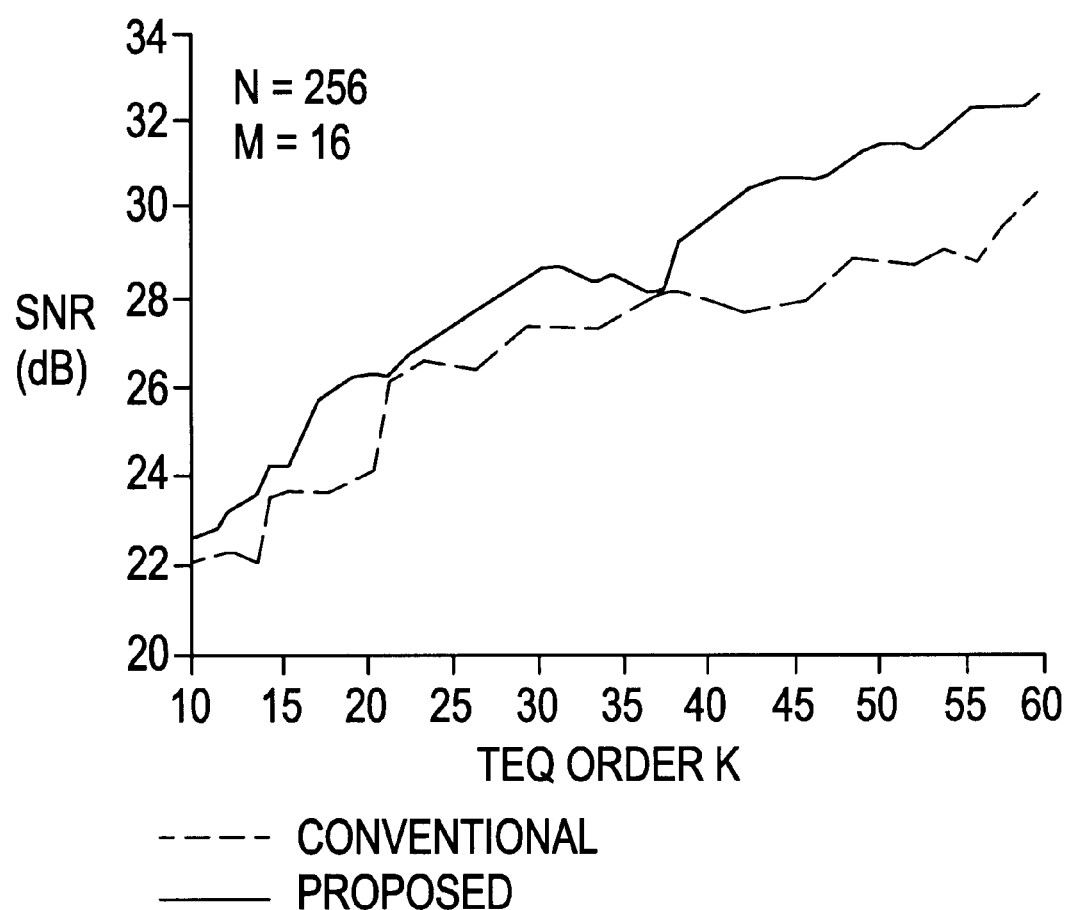
FIG. 5 depicts a comparison of the average signal-to-noise ratios of a traditional DMT versus those expected from a DMT comprising one embodiment of the present invention.

The impulse response, h(n), and its associated length, "L" can be given by:

$$h(n) = \sum_{k=-L_2}^{L_1} h_k \delta(n-k) \quad (1)$$

$$L = L_1 + L_2 + 1$$

where $L_1$ and $L_2$ are the lengths of causal and noncausal portions of h(n), respectively (see FIG. 1) and where the time of reference (i.e., n=0), h(n) is indicated as $h_0$.

In an illustrated embodiment of the present invention, if M is used to indicate the cyclic prefix length, and K represents the order of a TEQ, an optimum TEQ coefficients vector "$W_{opt}$" is given by:

$$W_{opt} = (\sqrt{B^T})^{-1} l_{min} \quad (2)$$

where $1_{min}$ corresponds to a eigenvector selected from a matrix eigenvector, C. It should be understood that the matrix "C" comprises a complex mathematical matrix of eigenvectors. Each eigenvector has associated with it an eigenvalue. More specifically, then, $1_{min}$ comprises the eigenvector of C with the minimum eigenvalue.

The value of "$1_{min}$" is calculated using a set of complex mathematical equations. In an illustrative embodiment of the present invention, the value of $1_{min}$ envisioned by the present inventor will be different than the value used in present devices and methods. Because $1_{min}$ is different, the resulting coefficients vector, $W_{opt}$, will also be different.

The derivation of a different coefficients vector generates new coefficients. From the discussion above, it is the coefficients which are used to suppress IBI generated by the tails. In sum, then, the derivation of a new $1_{min}$ results in the generation of new coefficients.

In an illustrative embodiment of the present invention, novel TEQ's comprising novel coefficients are adapted to substantially minimize IBI.

These novel coefficients are generated by realizing that each portion (i.e., point) along a length L of an impulse response h(n) contributes a different, non-uniform amount of IBI; not a uniform amount as was assumed prior to the present invention.

Because each point contributes a different amount of IBI, the weight which must be applied to each point will vary from point to point.

To vary the weights applied to each point within a tail of an impulse response requires the generation of new coefficients making up coefficients vector $W_{opt}$.

Generating the correct coefficients requires calculating $W_{opt}$ using equation (2) and, in particular, solving for new $1_{min}$.

Continuing, $1_{min}$ can be derived by solving for C, the eigenvector matrix. C can be represented as:

$$C = (Q\sqrt{\lambda^{-1}}A(\sqrt{\gamma}Q^{-1}) \quad (3)$$

with $$B = Q'Q^T = (Q\sqrt{\lambda}(Q\sqrt{\lambda})^T = \sqrt{B}\sqrt{B^T} \quad (4)$$

where A and B are defined in terms of $H_{win}$ and $H_{wall}$ as follows:

$$A = H^T_{wall} G H_{wall}$$

$$B = H^T_{win} H_{win} \quad (5)$$

with the convolution matrices $$H_{wall} = \begin{bmatrix} h_{-L_2} & 0 & \ldots & 0 \\ \vdots & & & \\ h_{-1} & \ldots & & h_{-k} \\ h_{M+1} & \ldots & & h_{M-K+2} \\ 0 & & & 0 \\ \vdots & & & \vdots \\ 0 & \ldots & & h_{L_1} \end{bmatrix} \quad H_{win} = \begin{bmatrix} h_0 & h_{-1} & \ldots & h_{1-k} \\ h_1 & h_o & \ldots & h_{2-k} \\ \vdots & & & \vdots \\ h_M & h_{M-1} & \ldots & h_{M-K+1} \end{bmatrix} \quad \text{and} \quad (6)$$

$$G = \begin{bmatrix} L_2 & 0 & \ldots & 0 \\ 0 & L_{2-1} & & 0 \\ \vdots & & & \vdots \\ 0 & \ldots & & 1 \\ 1 & 0 & \ldots & 0 \\ 0 & 2 & & \vdots \\ \vdots & & & \\ 0 & \ldots & & L_1 - M \end{bmatrix} \quad (7)$$

In an illustrative embodiment of the present invention, a novel weighting matrix "G" comprises differential factors $G_n$ which are selected to substantially minimize IBI caused by the tails of an impulse response. These differential factors are selected by taking into account the fact that each point along the tail of an impulse response contributes a different, non-uniform amount, of IBI. More specifically, it has been discovered by the present inventor that points further from a time of reference (such as the time of reference disclosed in co-pending U.S. patent application Ser. No. 09/639,642) contribute more IBI than points closer to the time of reference (e.g., point 1 in FIG. 1 contributes more IBI than point 2). As envisioned by the present inventor, novel matrix G and factors $G_N$ have, before now, never been used to minimize IBI. Working backwards, once matrix G is generated, $1_{MIN}$ can also be generated leading to the generation of a new $W_{opt}$ and, ultimately, to new coefficients (hereinafter "differential" coefficients).

Referring to FIG. 4, there is shown an example of a novel TEQ 204 adapted to substantially eliminate IBI. Such a TEQ comprises differential coefficients or weights $W_o \ldots W_n$ derived from $W_{opt}$ and $1_{min}$. An example of how TEQ 204 operates is as follows.

Transmitter 101 again generates and transmits a signal $S_1$ (e.g., DSL signal) through communication channel 102 whose impulse response 102a associated with signal $S_1$ is known and is represented graphically in FIG. 3.

Upon exiting the channel 102 signal $S_2$ is received by TEQ 204 using means known in the art.

Thereafter, TEQ 204 is adapted to filter out the effects of IBI. More specifically, TEQ 204 is adapted to apply differential coefficients to signal $S_2$ to compensate for the effects of IBI. These coefficients may be "hard-wired" or programmed into TEQ 204.

Signal 31 output from TEQ 204 can then be sent to receiver 103. Signal $S_{31}$ in FIG. 4 differs from signal $S_3$ in FIG. 3 because power within the tails has been substantially minimized in signal $S_{31}$, while it is still present in the tails of signal $S_3$. Because power is substantially minimized, the effects of IBI are also substantially minimized in signal $S_{31}$ as well.

TEQ 204 may comprise one or more integrated circuits, discrete devices or some combination of the two. In an alternative embodiment of the present invention, the device 204 comprises a DMT or DSL transceiver adapted to carry out the features and functions of the TEQ 204 described above. Typically, a TEQ will be the "front-end" of a receiver or the like. Again, it should be noted that TEQ 204 is one type of a FIR filter.

FIG. 5 depicts a comparison of the average signal to noise ratio ("SNR") of two DMT receivers. The SNRs represented by the dotted line were generated by a DMT comprising a conventional or traditional TEQ while the SNRs represented by the continuous line are theoretical SNRs expected to be realized by a DMT comprising a TEQ envisioned by an embodiment of the present invention and a TOR, such as the TOR disclosed in co-pending U.S. patent application Ser. No. 09/639,642.

The SNRs were calculated using a communication channel which comprised an 8Kft, 24 AWG twisted pair copper wire. The cyclic prefix length was set at M=16 with a sampling frequency of 1.104 and block length of N=256. As illustrated in FIG. 5, DMTs and/or TEQs envisioned by the present invention provide increased SNRs. These increased SNRs lead to the substantial minimization of IBI.

Though the above discussion focuses on devices for substantially minimizing IBI, the present inventor also envisions methods for carrying out the features and functions of the present invention.

It is to be understood that changes and variations may be made without departing from the spirit and scope of this invention as defined by the claims that follow.

I claim:

1. A device for substantially minimizing interblock interference (IBI) comprising:

a finite impulse response filter adapted to:
select differential factors by taking into account that points along a tail of a channel impulse response contribute non-uniform amounts of IBI; and
apply differential coefficients derived from a matrix of the differential factors to the channel impulse response.

2. The device as in claim 1 wherein the finite impulse response filter comprises a time domain equalizer.

3. The device as in claim 1 wherein the device comprises a digital, multi-tone transceiver.

4. The device as in claim 1 wherein the device comprises a digital subscriber loop transceiver.

5. The device as in claim 1 wherein the filter is adapted to apply the differential coefficients to tails of the impulse response.

6. A method for substantially minimizing interblock interference comprising:

selecting differential factors by taking into account that points along a tail of a channel impulse response contribute non-uniform amounts of IBI; and applying differential coefficients derived from a matrix of the differential factors to the channel impulse response.

7. The method as in claim 6 further comprising applying the differential coefficients to tails of the impulse response.

* * * * *